United States Patent [19]

Poche

[11] 3,925,991
[45] Dec. 16, 1975

[54] FLOATING OIL FENCE

[76] Inventor: John M. Poche, 6317 Franklin Ave., New Orleans, La. 70122

[22] Filed: July 24, 1974

[21] Appl. No.: 491,522

[52] U.S. Cl............. 61/1 F; 114/.5 F; 210/DIG. 21
[51] Int. Cl.² ....................................... E02B 15/04
[58] Field of Search............. 114/.5 F, .5 T, 235 R, 114/235 A, 77 R; 61/1 F, 5; 210/242, DIG. 21; 403/57, 58, 157

[56] References Cited
UNITED STATES PATENTS

| | | | |
|---|---|---|---|
| 2,240,567 | 5/1941 | Meacham et al. | 61/1 F |
| 2,945,465 | 7/1960 | Barton | 114/.5 T |
| 3,362,372 | 1/1968 | Peterson | 114/235 R |
| 3,630,033 | 12/1971 | Tuttle | 61/1 F |
| 3,651,647 | 3/1972 | Flaviani | 61/1 F |
| 3,702,657 | 11/1972 | Cunningham et al. | 61/1 F |

FOREIGN PATENTS OR APPLICATIONS

| | | | |
|---|---|---|---|
| 1,305,469 | 7/1961 | France | 61/1 F |

Primary Examiner—Trygve M. Blix
Assistant Examiner—Charles E. Frankfort
Attorney, Agent, or Firm—Morris Sussman

[57] ABSTRACT

This invention consists of a plurality of floating interlocking pontoons that are connected together to form a floating oil fence around spilled oil in harbors, lakes, rivers, gulfs, deep seas, or any other bodies of water. The interlocking sealed couplings permit lateral, longitudinal, vertical, and horizontal movement of each pontoon in such a manner that the oil within the confines of the fence will not seep out between the coupled pontoons. Oil contained within the aforesaid fence may be pumped into the interlocked pontoons for storage or transported after being picked up by larger vessels.

12 Claims, 12 Drawing Figures

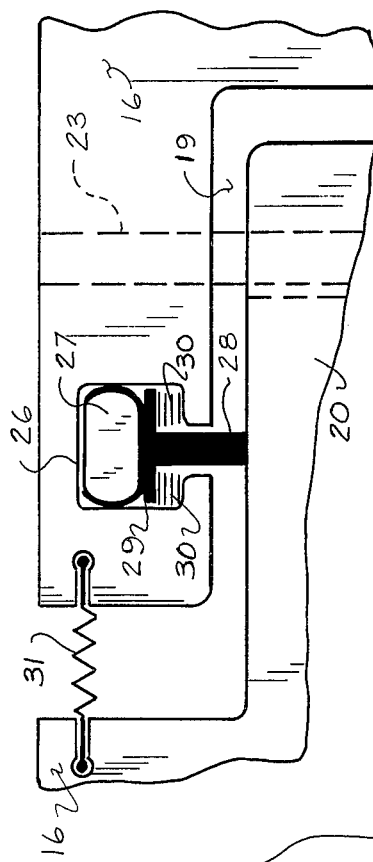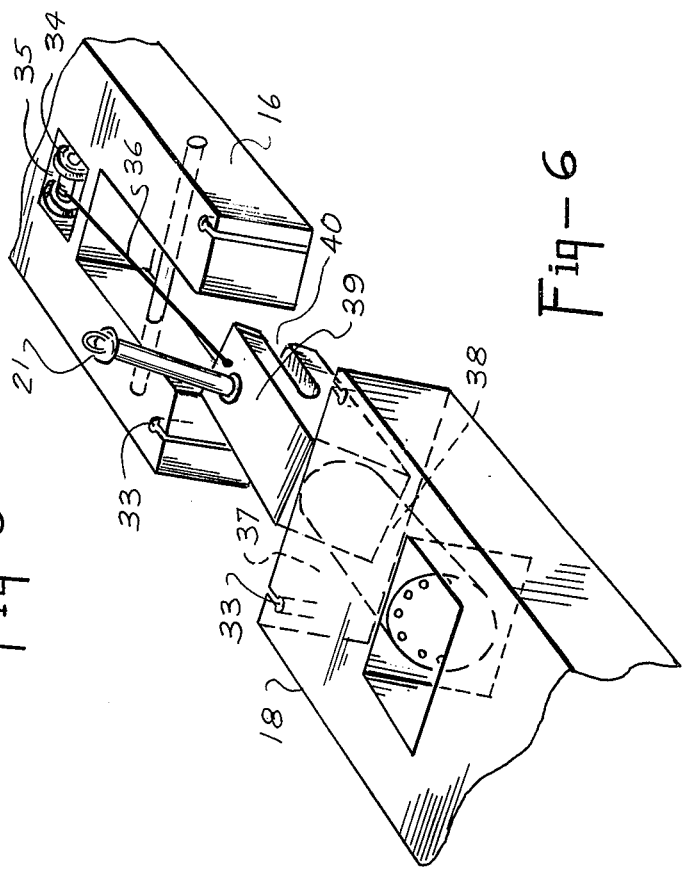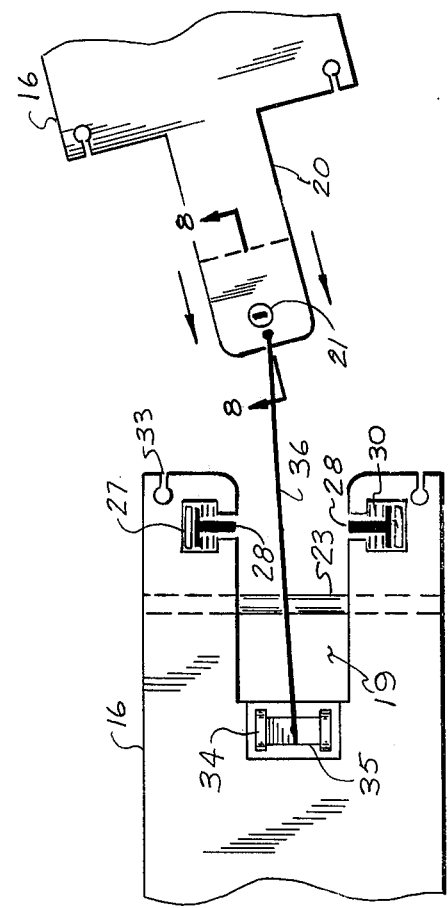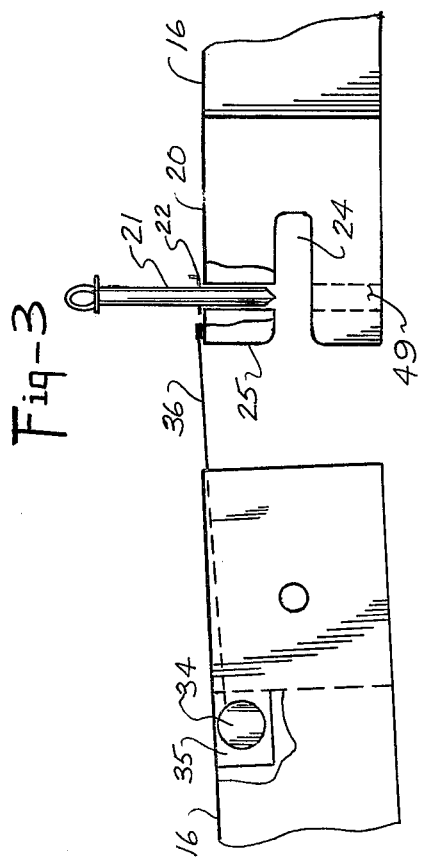

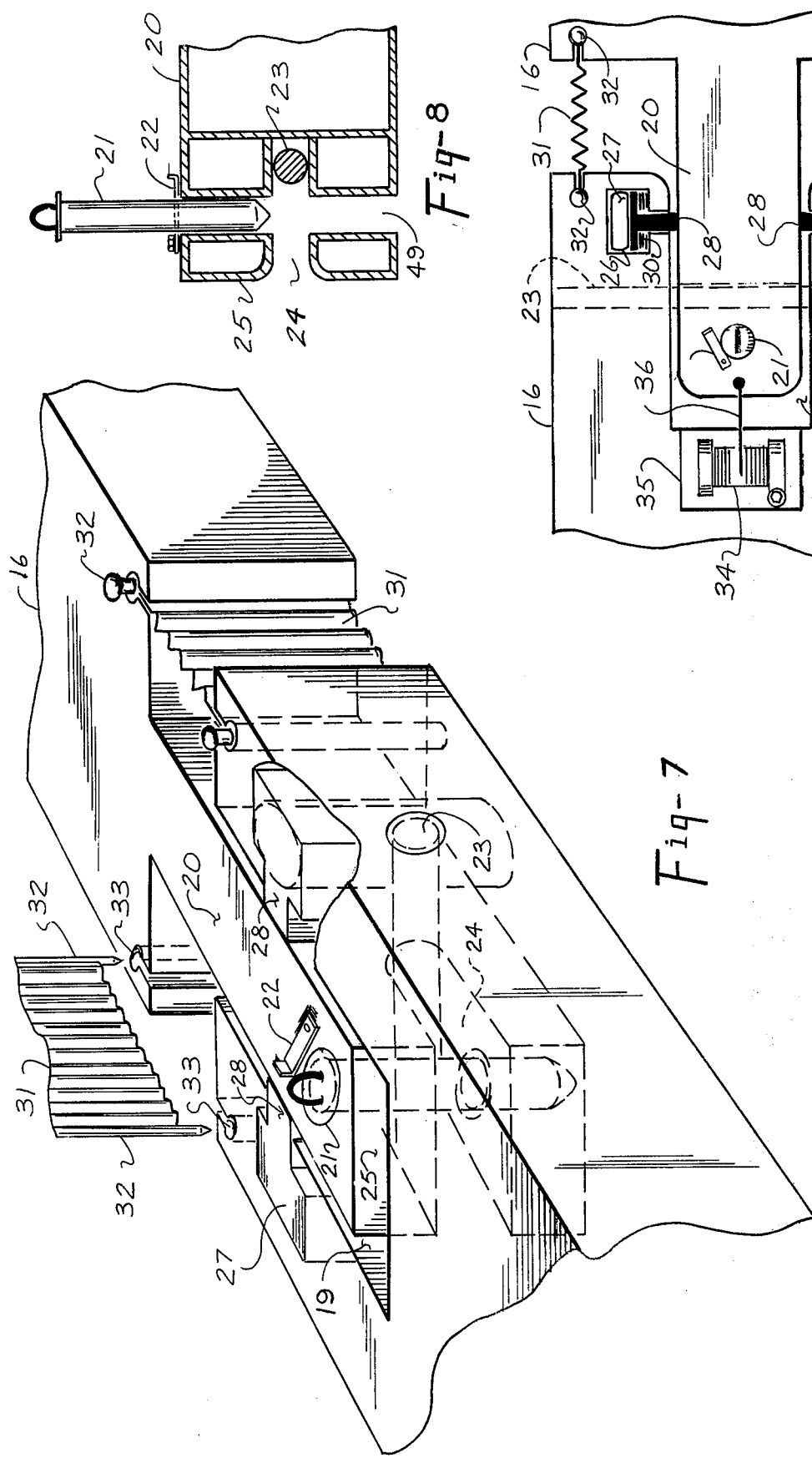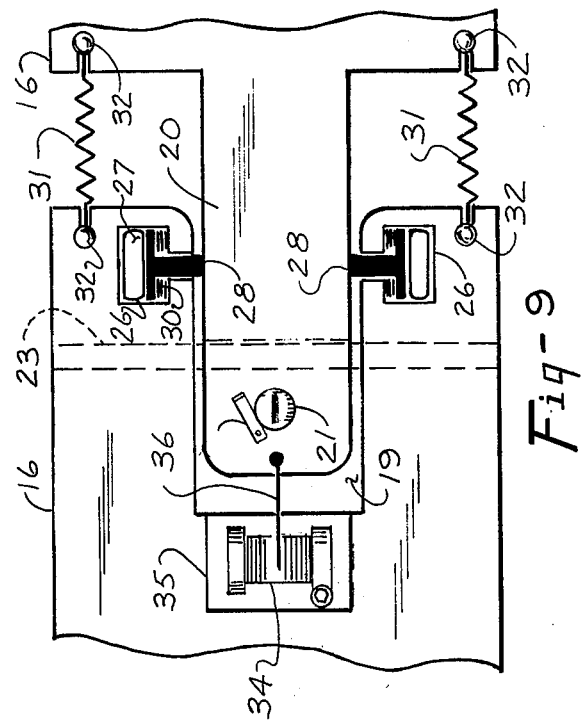

FLOATING OIL FENCE

BACKGROUND OF THE INVENTION

This invention relates to a pollution containment structure in the form of a floating fence which, due to the fact that there is a very urgent need for encompassing oil floating spills on a body of water, is what I personally and hereinafter call a Floating Oil Fence.

This invention is designed to assist in the increasing problems of containing oil spills from damaged ships, drilling platforms and/or any other structures in and on the sea and other waters.

This invention provides a floating oil fence of the character herein described embodying floating oil containment units having several unique and different features, namely:

1. A rectangle of sealed flexible coupled interlocking pontoons that provide a positive oil fence to confine and to contain the oil in an area of almost any proportion.

2. The invention also provides work space on or below the deck of the pontoons as well as space for the storage of powered oil skimmer equipment, and storage space for salvaged oil that is recovered by the aforesaid skimmer equipment and/or other means, the oil then being stored inside of the aforesaid pontoons for pickup by larger vessels.

3. The already-mentioned unique features of this novel invention provide, among other things, interlocking mechanism that is positively flexible sealed coupling of the pontoons into a continuous floating oil fence or wall. This invention also allows for movement with a positive two dual set of seals, each coupling for compensation of lateral roll and horizontal movement of the pontoons due to wave action of the supporting waters in order to retain the integrity of the pollution contained area encompassed by the aforesaid fence.

4. The invention is also provided with an electromagnetic coupler to couple the oil fence to the side of a damaged oil tanker or vessel in order to form a rectangular containment to the side of the just-mentioned tanker or vessel and thus to fence in the oil spill and prevent the pollution from spreading and producing untold damage to sea life, wild life, property, and producing other environmental problems.

5. This invention also provides an oil fence of the character herein described that is located around a fixed offshore structure, such as a drilling platform, or its aforesaid fence can be floated semi-assembled and installed in a constant position or attached to a damaged drifting oil tanker from which oil is spilling or has already spilled. Operation of the interlocking structures is such that they require only the minimum of complicated mechanisms or parts that cannot be replaced and/or maintained in the field by men of ordinary skills known in the art and employed in the oil field industry.

6. This invention also provides an oil fence that can be formed into any desired size structure to increase and/or to reduce the containment area merely by adding or removing one or more of the interlocking pontoons. The pontoons may, if it is desired, be of the self-propelled type, or the pontoon unit may be of almost any proportions.

I have now given the background of my invention whose objects are as follows:

The principal object of this invention of a floating oil fence is to provide a unique structure made up of a plurality of floating interlocking units which when coupled together will form a fence around any desired area of pollution that may be floating on the sea or the like.

Another object of this invention is to provide a floating oil fence of the character herein described that has a deck on the top of each floating interlocking unit for support of fire fighting equipment and similar activities as well as providing on or below deck storage for oil or other liquid that may be recovered from the spills and stored for pickup by larger tank vessels.

Another object of this invention is to provide a floating oil fence whose interlocking units in the form of a plurality of pontoons may be towed into place coupled together in a train-like fashion and/or removed at will and anchored at any desired distance of safety in an emergency by mooring anchors, as will be understood by those experienced in the art.

Another object of this invention is to provide a floating oil fence whose interlocking pontoons are so interlocked that the pontoons can move with ease in either the longitudinal and/or lateral roll with wave action without projecting undue strain on the other said pontoons or couplings.

Still another object of this invention is to provide a floating oil fence that has each interlocking pontoon provided with a removably-vertically-disposed coupling pin at each coupling thereof that is dropped into place behind the fixed lateral coupling pin for the purpose of interlocking the pontoons together in combination with oil seals.

Still another object of this invention is to provide a floating oil fence of the character described that embodies two dual sets of seals at each coupling, interlocking couplings embodying a set of curtain type seals and a backup set of seals in a pneumatic type seal in order to make a positive sealed coupling at all angles of the wave action the pontoons (and couplings) may encounter and still confine and contain the oil on the surface of the water within the containment area on the surface or slightly below the surface of the aforesaid waters.

Still another object of this invention is to provide a floating oil fence of the character described that has a cable wench on one end of each interlocking pontoon so that a man on the pontoon can wind in the pontoon, thus pulling it in for the purpose of connecting the pontoons together once they have been floated in place even in rough waters.

Other and further objects and advantages of this novel invention of mine will no doubt appear as the reading of this specification and its appended claims proceeds and the accompanying drawings are examined in connection therewith.

In the drawings:

FIG. 3 is a top view of FIG. 4 indicating the pneumatic seal structure retracted for coupling.

FIG. 4 is a side view of two ends of two interlocking pontoons of this invention ready for coupling together in rough water and showing typical basic structure of this coupling.

FIG. 5 is a typical top view of one end and one side of each of two interlocked pontoons that have been coupled together showing how both the curtain type seal and the pneumatic seal structure are activated.

FIG. 6 is an enlarged pictorial view of one end of two of the interlocking pontoons, one of which is provided with alternate construction that embodies a swivel type connector.

FIG. 7 is an enlarged pictorial view of one end of two of the interlocking pontoons showing one curtain type seal in place and the other curtain seal about to be placed in a sealing position in the ends of the pontoons with one of the vertically-disposed pneumatic secondary seals shown in phantom lines.

FIG. 8 is an enlarged sectional view, taken substantially along line 8—8 of FIG. 3, and viewed in the direction indicated by the arrows.

FIG. 9 is a top view of two units end to end; a complete interlocking coupling with seal assemblies activated.

In the several views of the accompanying drawings of this invention, like parts are indicated by like reference numbers. The reference number 15 indicates this invention in its entirety; the reference number 16 indicates a typical interlocking pontoon of this invention.

Figure 1:
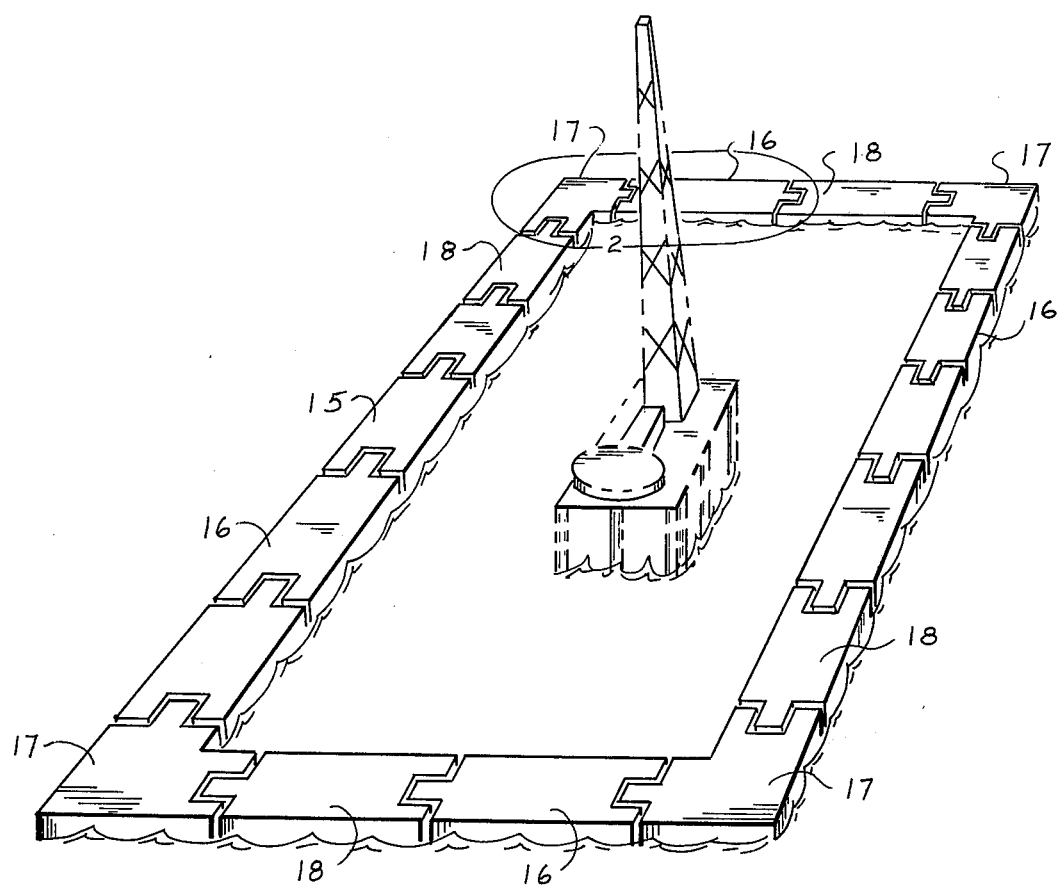
FIG. 1 is a pictorial view of this invention in actual use, said invention being anchored in position around an off shore drill platform.

Directing ones attention first to FIG. 1 of the accompanying drawings it will be seen that this invention 15 consists of a plurality of the aforesaid interlocking pontoons 16 and four interlocking corner pontoons 17. This invention also embodies the use of a number of swivel interlocking pontoons 18 in its makeup.

Figure 2:
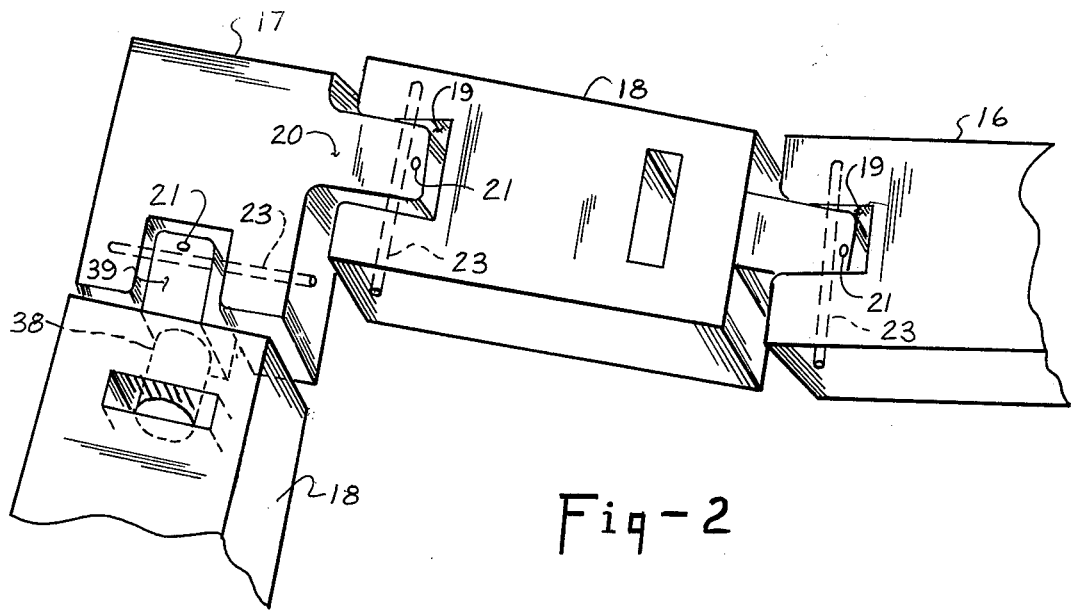
FIG. 2 is an enlarged pictorial view of that corner of FIG. 1 that is enclosed within the arrowed ellipse and indicated by the number 2 in FIG. 1.

Looking now at FIGS. 1, 2, and 3 of the drawings it will be seen that one end of pontoons 16 and 17 is provided with a U-shaped recess 19 while the other ends of the same pontoons have a rectangular projection 20 that slidably fits into the aforesaid U-shaped recess 19 of the next pontoon in line in the oil fence formed by the interlocking pontoons. The aforesaid rectangular projection 20 is provided with a vertically disposed tubular recess opening 49, through which the vertical coupling pin 21 is placed in order to hold two of the pontoons together. This novel construction is clearly illustrated in FIGS. 2, 3, 4, 7, 8, and 9 of the accompanying drawings. Each of the aforesaid vertical pins 21 is provided with an elongated horizontal slot in the side of the already-mentioned vertical pin 21 for the reception of the side edge of the swingable pin-lock 22 that is suitably secured to the top of the aforesaid rectangular projection 20 of each pontoon. It is obvious to those experienced in the art that the aforesaid lockpin 22 will hold the vertical pin 22 in the upward position shown in FIG. 8 of the drawings until the pin is to be dropped down in its opening for locking the pontoons together by means of the laterally disposed pin 23.

It is this novel combination of the often-mentioned vertical coupling pin 21 and the aforesaid laterally disposed pin 23 that hold the pontoons together, as one can see by examination of the drawings of this invention. Although not previously mentioned, it is obvious from examination of the already-mentioned FIGS. 4, 7, and 8 that a centrally located and horizontally-disposed slot 24 is necessary in the end 25 of the aforesaid rectangular projection 20 for the reception of the aforesaid laterally disposed pin 23 whose ends naturally pass through openings in each side of that end of the pontoons that has the aforesaid U-shaped recess 19 therein.

Directing ones attention once again to FIG. 7 of the accompanying drawings it will be seen that the end of each pontoon having the U-shaped recess 19 therein is provided with vertically disposed T-shaped recess 26 in each side thereof for the reception of the backup pneumatic seal assembly 27. This just-mentioned vertical pneumatic seal assembly consists of a basically rectangular container fabricated from flexible expandable material which is inflated with any desired expandable substance such as air, gas, etc. Obviously, when it is desired to inflate the aforesaid pneumatic seal assembly 27, air or the like is then pumped into the just and often-mentioned pneumatic seal assembly, and when it is desired to deflate the air bag, the air or the like is then released from the often-mentioned pneumatic seal assembly 27. This assembly is placed up against the suitable T-shaped sealing member 28 that is made of flexible fabric and metal embodied material that is in a vertical position as indicated in FIG. 7 and by the reference number 28. The rigid flat back surface 29 of the aforesaid T-shaped sealing member 28 is held in position by the aforesaid vertical positioned pneumatic sealing assembly 27 by means of the retraction spring assemblys 30 that are located in the position shown in FIGS. 3, 5, and 9 of the accompanying drawings. A vertically-disposed curtain-type seal assembly 31 has its ends provided with vertical rod-like members 32 for placement in a slidable manner in the recesses having a round opening in the outer end thereof. These recesses or coupling slots 33 are located in the ends of the aforesaid pontoons 16, 17, and 18 of this invention. Obviously, the vertically-disposed aforesaid curtain-type seal assemblies 31 are of an accordion-pleated-type construction of fabric and steel and are used for reasons of vertical rigidity.

Looking now at FIGS. 3 and 4 of the drawings it will be seen that a wench 34 is suitably mounted in a recess 35 at one end of each interlock pontoon at the inward end of the aforesaid U-shaped recess 19. The purpose of the just-mentioned wench 34 is to provide a cable 36 which has its outer end secured to the outer end of the aforesaid rectangular projection 20 as a means of winding or pulling the two pontoons together.

Going now back to FIG. 6 of the accompanying drawings it will be seen and recalled from reading that portion of this specification that this invention is constructed of a number of swivel interlocking pontoons 18. One end 37 of each pontoon 18 is provided with a centrally-located, longitudinally and vertically disposed tubular recess 49 in which is slidably fitted the tubular end 38 of the swivel 39 that is rectangular in configuration and which has a horizontally and laterally disposed slot or recess 40 in the outer end thereof. The purpose of the aforesaid swivel rectangular projection 39 is, as its name implies, to provide a swivel connection in the oil fence. As has been stated in an earlier part of this specification, this swivel connection is to provide means of giving this invention more lateral, longitudinal, vertical, and some rotation movement to its pontoons, thus preventing oil spill, as has already been told in this specification.

Figure 10:
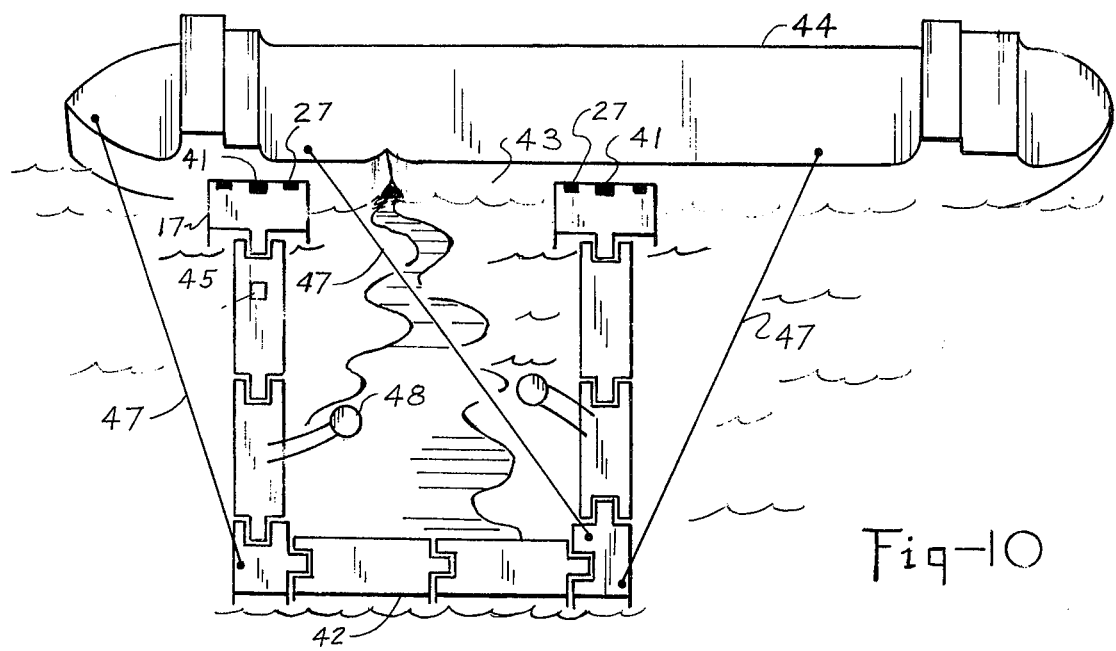
FIG. 10 is a top view of one of the many uses of this invention with a damaged ship shown pictorially with an oil spill contained by the said oil fence.
Figure 12:
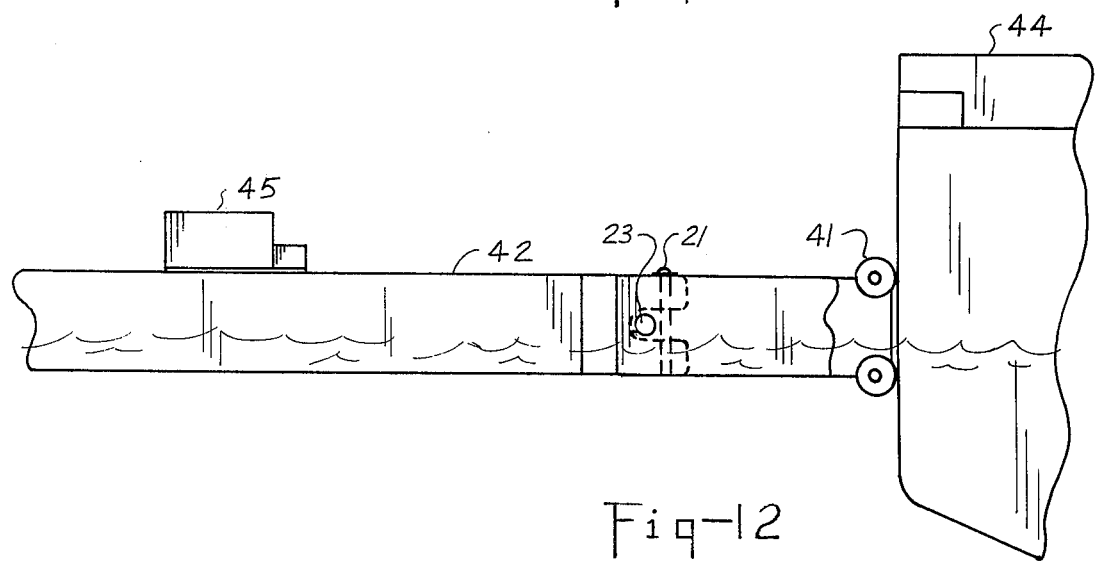
FIG. 12 is an enlarged side view of that portion of this invention that is indicated by the arrowed line and number 12 in FIG. 10.

Directing ones attention now to FIGS. 10 and 12, we herein see illustrated an alternate application of this novel invention. The structure shown in these two just-mentioned figures embodies the use of electro-magnets 41 that are actually couplers in the form of contact magnetic rollers so adapted in the outer end of each of the pontoons 42 as to permit only vertical wave movements of the pontoons against the side 43 of the vessel 44. These pontoons 42 and their interlocked pontoons form the rest of the rectangular or any other desired shape of oil fence that is this invention. The aforesaid electro-magnets 41 obtain their electricity from an electric generator 45 that is located on the deck of the pontoon 42 or from the electric supply system of the aforesaid vessel 44 which is the damaged oil tanker therein from which oil is spilling out into the water. The recently-mentioned electric supply of the vessel, the aforesaid electro magnets 41, will become activated (magnetized couplers) and thus hold the oil fence unit coupled to the vessel's side 43.

Figure 11:
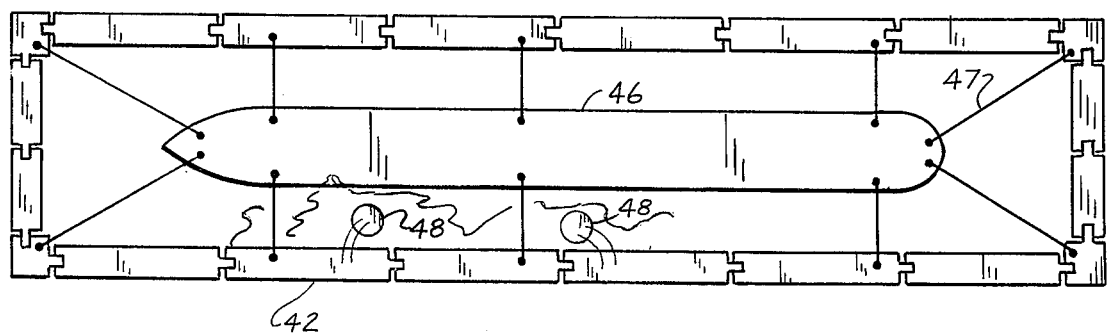
FIG. 11 is a top view of still another application of this invention showing the ship completely encompassed by the oil fence.

Looking for a moment at FIG. 11 of the drawings it will be seen that there is herein illustrated another application of this novel invention in which a ship 46 is encompassed by a plurality of the interlocking pontoons that go to make up a rectangular oil fence around the aforesaid ship 46 from which oil is spilling into the sea from ruptured tanks. Obviously, the aforesaid ship 46 must be secured in place in the rectangle formed by the floating oil fence by a plurality of suitably located cables 47.

Although not part of this invention, mention must herein be made of the use of oil skimmers 48 for the removal of oil from the water confined within this oil fence I have invented. The aforesaid skimmers are only shown in FIGS. 10 and 11 of the accompanying drawings.

It will be realized by those experienced in the art that not every detail of this invention is illustrated in every view of the drawings for reasons of clarity This invention is subject to any and all changes in detail design, construction, and/or modifications that one may care to make in so long as the changes and/or modifications all fall within the scope and intent of the appended claims.

Having now described the detail construction and use of this novel invention as well as having given some of the background in the first part of this specification, what I now claim as new and desire to secure by grant of Letters Patent is:

1. A floating oil fence comprising a plurality of interlocking pontoons, flexibly connected in a rectangular-like shaped form around oil or other pollutant, the interlocked pontoons capable of riding waves longitudinally and laterally without becoming disconnected and without permitting pollutants within the rectangle-like shape from seeping out to the water outside said rectangle, each of said pontoons having a rigid rectangular projection at one end and a vertically disposed U-shaped recess at the other end, the recess being adapted to slidably receive the rectangular projection of the next pontoon, said rigid rectangular projection being provided with a longitudinally and laterally disposed recess in the outer end and sides thereof through which passes both a vertically disposed coupling pin and a laterally disposed pin, the pins preventing the pontoons from becoming disconnected when interlocked.

2. The invention of claim 1, wherein that end of each said pontoon in which the U-shaped recess is located is provided with a vertically disposed T-shaped recess in each inner side of said vertical U-shaped recess and near the outer ends of the pontoon for the reception of a backup pneumatic seal assembly that is in contact with vertical walls of said rectangular projection of the next unit.

3. The invention of claim 2, wherein the said pneumatic seal assembly embodies an air bag made of flexible, expandable material, said air bag being inflatable with gas at any desired pressure, the said air bag having a vertical rigid surface which bears against a rigid surface of a T-shaped sealing member that is made of flexible steel embodied material; said T-shaped member being held in an activated position against the vertical walls of said rectangular projection by said air bag when said air bag is inflated to activate said seals.

4. The invention of claim 3, wherein the said pneumatic seal is deactivated by deflating the air bag of the seal assembly, the said T-shaped sealing member being held in a retracted position by a rectraction spring assembly that is now retracted back into the T-shaped recess for installation purpose, the seals now being deactivated.

5. The invention of claim 4, wherein said pontoons are provided with an interlocking curtain-type, vertically-disposed accordion type seal that is made from fabric and steel, the steel being used for reasons of vertical rigidity while the entire curtain is a flexible assembly having a vertically-disposed rod-like member on each end adapted for placement in a vertically-disposed slot having a rounded inner end and, when the said curtain is thus secured to the said pontoons by means of the vertically-disposed rod-like members, the said curtain forms a seal that prevents any oil or other pollutants from entering the space between the ends of the connected pontoons.

6. The invention of claim 5, wherein said interlocking pontoons are provided with a wench located in a recess at the inner end of the rectangular recess in each pontoon; the said wench being provided with a cable that has its outer end adapted to be connected to the outer end of the rectangular projection of the next pontoon in line in the said oil fence; the said cable thus providing a means of drawing the ends of the said pontoons together after they have been placed in coupling position in rough water.

7. The invention of claim 6, wherein said rectangular projection of each said interlocking pontoon is provided with a swing pin-lock on the top surface of the pontoon; the said pin-lock is adapted to be swung into locking position by having one longitudinal edge of the said pin-lock placed in a slot in the said vertically disposed coupling pin and thus holding said pin up and out of a locking position until it is ready for the pontoons to be interlocked together at which time the said pinlock is swung out of said slot in the vertically-disposed coupling pin and the said pin dropped down behind the lateral coupling pin into locking position thus coupling the pontoons together.

8. The invention of claim 7, wherein an outer end of a corner pontoon is provided with one or more electro magnetic coupling devices said electro magnetic coupling devices being roller in configuration and being activated by either a generator located on the top surface of the said corner pontoon or from electricity supplied through a cable from the electric supply of the vessel to which the pontoons are secured by the electro magnets.

9. The invention of claim 8, wherein said electro magnetic coupling devices permit vertical motion of the floating oil fence along the side of the larger vessel in order to compensate for the difference between the motions of said oil fence and said vessel.

10. The invention of claim 8, wherein the said interlocking pontoons are provided with a deck for men to work on and space on/and below the said deck for holding equipment and the like as well as one or more compartments within each said pontoon in which oil or the like may be stored.

11. The invention of claim 10, wherein the said floating oil fence has at least several of said pontoons connected together by means of swivel interlock sealed couplings which permit the said pontoons to move on the water at the will of the wave action in lateral, longitudinal and vertical positions at the same time.

12. The invention of claim 11, wherein each said swivel coupling is in the form of a rectangular member having a longitudinally disposed recess in the outer end thereof for receiving a laterally disposed coupling pin and a vertically disposed recess in the outer end thereof for receiving a vertically disposed coupling pin, as well as a longitudinally disposed outwardly projecting tubular element extending from the inner end thereof which tubular element slidably fits into a longitudinally disposed recess in the outer end of the said interlocking pontoon to permit relative rotation of said rectangular member about the longitudinal axis of said interlocking pontoon.

* * * * *